United States Patent
Frost et al.

(10) Patent No.: US 6,643,802 B1
(45) Date of Patent: Nov. 4, 2003

(54) COORDINATED MULTINODE DUMP COLLECTION IN RESPONSE TO A FAULT

(75) Inventors: Bruce J. Frost, Redondo Beach, CA (US); Donald J. Lewis, Claremont, CA (US); Nancy J. Cochran, Redondo Beach, CA (US); Dennis R. Calkins, Carson, CA (US); Mark A. Geisert, El Segundo, CA (US); Carl Chih-Fen Hsieh, San Diego, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/558,984

(22) Filed: Apr. 27, 2000

(65) Prior Publication Data
(65)

(51) Int. Cl.$^7$ ............................................. G06F 11/00
(52) U.S. Cl. ................................. 714/37; 714/31
(58) Field of Search ........................ 714/31, 45, 48, 714/57, 25, 37

(56) References Cited

U.S. PATENT DOCUMENTS

| | | | | |
|---|---|---|---|---|
| 5,046,068 A | * | 9/1991 | Kubo et al. .................... 714/25 |
| 5,056,091 A | * | 10/1991 | Hunt ........................... 714/10 |
| 5,253,359 A | * | 10/1993 | Spix et al. .................... 714/46 |
| 5,303,383 A | | 4/1994 | Neches et al. |
| 5,371,883 A | * | 12/1994 | Gross et al. ................... 714/38 |
| 5,485,573 A | * | 1/1996 | Tandon ......................... 714/25 |
| 5,537,535 A | * | 7/1996 | Maruyama et al. ............ 714/25 |
| 5,619,644 A | * | 4/1997 | Crockett et al. .............. 714/45 |
| 5,640,584 A | | 6/1997 | Kandasamy et al. |
| 5,642,478 A | * | 6/1997 | Chen et al. .................... 714/45 |
| 5,664,093 A | * | 9/1997 | Barnett et al. ................. 714/31 |
| 5,699,505 A | * | 12/1997 | Srinivasan .................... 714/31 |
| 5,774,645 A | * | 6/1998 | Beaujard et al. .............. 714/25 |
| 5,845,062 A | * | 12/1998 | Branton et al. ................ 714/25 |
| 5,872,904 A | | 2/1999 | McMillen et al. |
| 5,884,019 A | * | 3/1999 | Inaho ............................ 714/6 |
| 5,961,642 A | | 10/1999 | Lewis |
| 6,000,040 A | * | 12/1999 | Culley et al. .................. 714/31 |
| 6,000,046 A | * | 12/1999 | Passmore ...................... 714/57 |
| 6,065,136 A | * | 5/2000 | Kuwabara ..................... 714/31 |
| 6,105,150 A | * | 8/2000 | Noguchi et al. ............... 714/44 |
| 6,289,379 B1 | * | 9/2001 | Urano et al. .................. 709/223 |
| 6,430,712 B2 | * | 8/2002 | Lewis ........................... 714/47 |
| 6,470,388 B1 | * | 10/2002 | Niemi et al. ................. 709/224 |

* cited by examiner

Primary Examiner—Robert Beausoliel
Assistant Examiner—Gabriel Chu
(74) Attorney, Agent, or Firm—Trop, Pruner, Hu, P. C.

(57) ABSTRACT

A multi-node parallel processing system includes multiple nodes each including the capability to handle faults. When a fault is detected, a fault handling procedure is launched. This may include invoking a dump capture handler to stop execution of all applications as well as control the saving of dump information to slave dump databases. The node in which the fault occurred sends a broadcast message to all the other nodes to indicate the fault condition. In response to the message, each of the other nodes also captures predetermined dump information into slave dump databases. The system is then restarted. After the system has started up again, a master dump save routine is started on a master node. The master dump save routine then launches slave dump save routines in each of the nodes to coordinate the collection of dump information. The master dump save routine can query the information stored in each of the slave dump routines and select a subset of the information desired. In response, the slave dump save routines then communicate the requested dump information to the master node.

39 Claims, 4 Drawing Sheets

COORDINATED MULTINODE DUMP COLLECTION IN RESPONSE TO A FAULT

BACKGROUND

The invention relates to storing information in response to a fault occurring in a parallel processing system.

Software in a computer system may be made up of many layers. The highest layer is usually referred to as the application layer, followed by lower layers that include the operating system, device drivers (which usually are part of the operating system), and other layers. In a system that is coupled to a network, various transport and network layers may also be present.

During execution of various software routines or modules in the several layers of a system, errors or faults may occur. Such faults may include addressing exceptions, arithmetic faults, and other system errors. A fault handling mechanism is needed to handle such faults so that a software routine or module or even the system can shut down gracefully. For example, clean-up operations may be performed by the fault handling mechanism, and may include the deletion of temporary files and freeing up of system resources. In many operating systems, exception handlers are provided to handle various types of faults (or exceptions). For example, exception handlers are provided in WINDOWS® operating systems and in UNIX operating systems.

Software may be run on single processor systems, multiprocessor systems, or multi-node parallel processing systems. Examples of single processor systems include standard desktop or portable systems. A multiprocessor system may include a single node that includes multiple processors running in the node. Such systems may include symmetric multiprocessor (SMP) systems. A multi-node parallel processing system may include multiple nodes that may be connected by an interconnect network.

Faults may occur during execution of software routines or modules in each node of a multi-node parallel processing system. When a fault occurs in a multi-node parallel processing system, it may be desirable to capture the state of each node in the system. A need thus exists for a method and apparatus for coordinating the handling of faults occurring in a system having multiple nodes.

SUMMARY

In general, according to one embodiment, a method of handling faults in a system having plural nodes. Includes detecting a fault condition in the system and starting fault handling routine in each of the nodes. Selected information collected by each of the fault handling routines is communicated to a predetermined one of the plural nodes.

Other features and embodiments will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

In accordance with some embodiments, a fault or crash handler executable on each node of a multi-node parallel processing system saves information relating to execution of software and the state of the node at the time of a fault or crash. Saving of such information may be referred to as performing a "dump" of predetermined system and software-related information. As used here, a "fault" or "crash" refers to an error occurring during execution of software that have been deemed serious enough to merit a subsequent debug operation to determine the source of the error. Although a fault may occur in one node, the dump operation may be invoked in each of the nodes of the parallel processing system to perform a dump of information from all of the nodes in the system. The dumped information may then be communicated back for collection in a master node. To coordinate the saving of dump information across the nodes, a master dump save routine is started in the master node, which launches slave dump save routines in each of the nodes to coordinate the saving and communication of the dumped information in the system.

Figure 1:
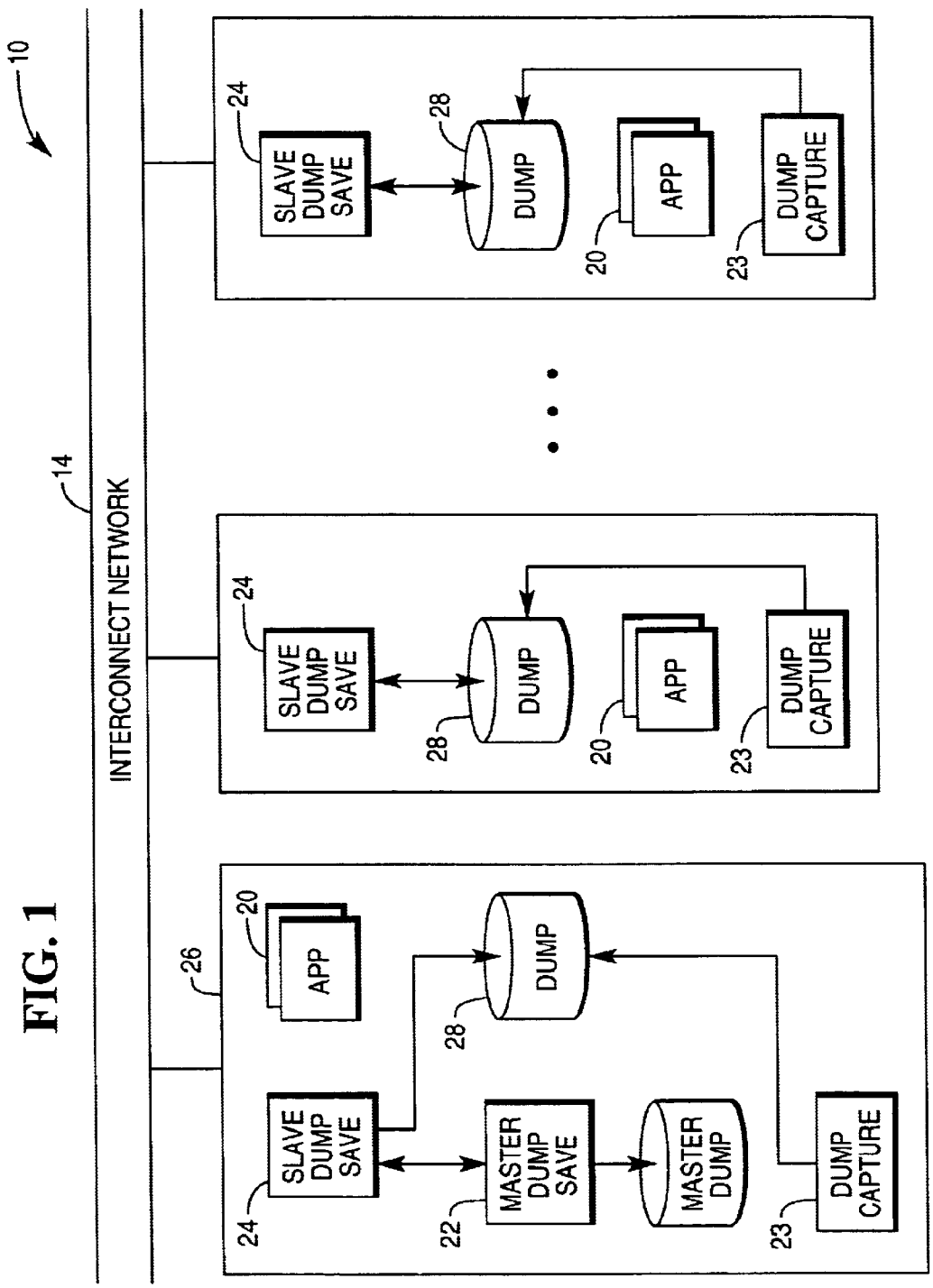
FIG. 1 is a block diagram of an embodiment of a parallel processing system including multiple nodes.

Referring to FIG. 1, a system 10 in accordance with one embodiment may be a multi-node parallel processing system with a plurality of nodes 12A, 12B, and 12C, collectively referred to as nodes 12. The number of nodes 12 may be greater than or equal to two. The nodes 12 are coupled by an interconnect network 14 to enable communication between the nodes 12. Each of the nodes 12 includes a dump capture routine 23 that is executable in case a fault condition is detected. When executed, the dump capture routine 23 halts all application software that may be running in the node and writes dump information into a corresponding slave dump database 28 in each node.

The node in which the fault condition was detected then issues a broadcast message over the interconnect network 14 to notify the other nodes of the fault condition. In response, a dump capture handler 23 is invoked in each of the other nodes 12. The dump capture handlers 23 in each of the other nodes then stops application software running in the node and saves predetermined dump information into corresponding dump databases 28.

After dump capture, a master dump save routine 22 may be launched in one of the nodes (e.g., 12A). The master dump save routine 22 then launches slave dump save routines 24 in each of the nodes 12. The master dump save routine 22 then cooperates with the slave dump save routines to coordinate the saving of selected information from the slave dump databases 28 into a master dump database 26.

Various application modules 20 may be running in each of the nodes 12. In one embodiment, the application modules 20 may be part of a data warehouse system that stores, manages, analyzes, and reports transaction data, e.g., retail transaction data. In other embodiments, other types of application modules 20 may be present. Application modules 20 that are associated with a data warehouse system may include database management applications as well as modules for memory management, performance of parallel services, lock management, and so forth.

In one example embodiment, the application modules 20 associated with a data warehouse system may be advantageously run on a multi-node parallel processing system due to the relatively large amounts of data involved. Generally, a data warehouse may include copies of transaction data (e.g., retail transaction data) that have been structured for query and analysis or reporting. The retail transaction data may track purchases made by users of goods and services from participating retail sources. The data warehousing application may perform the collection, management, analysis, and reporting of such transaction data. The volume of data involved in data warehouse systems may be extremely large, typically in the gigabyte range and sometimes in the terabyte range.

Figure 2:
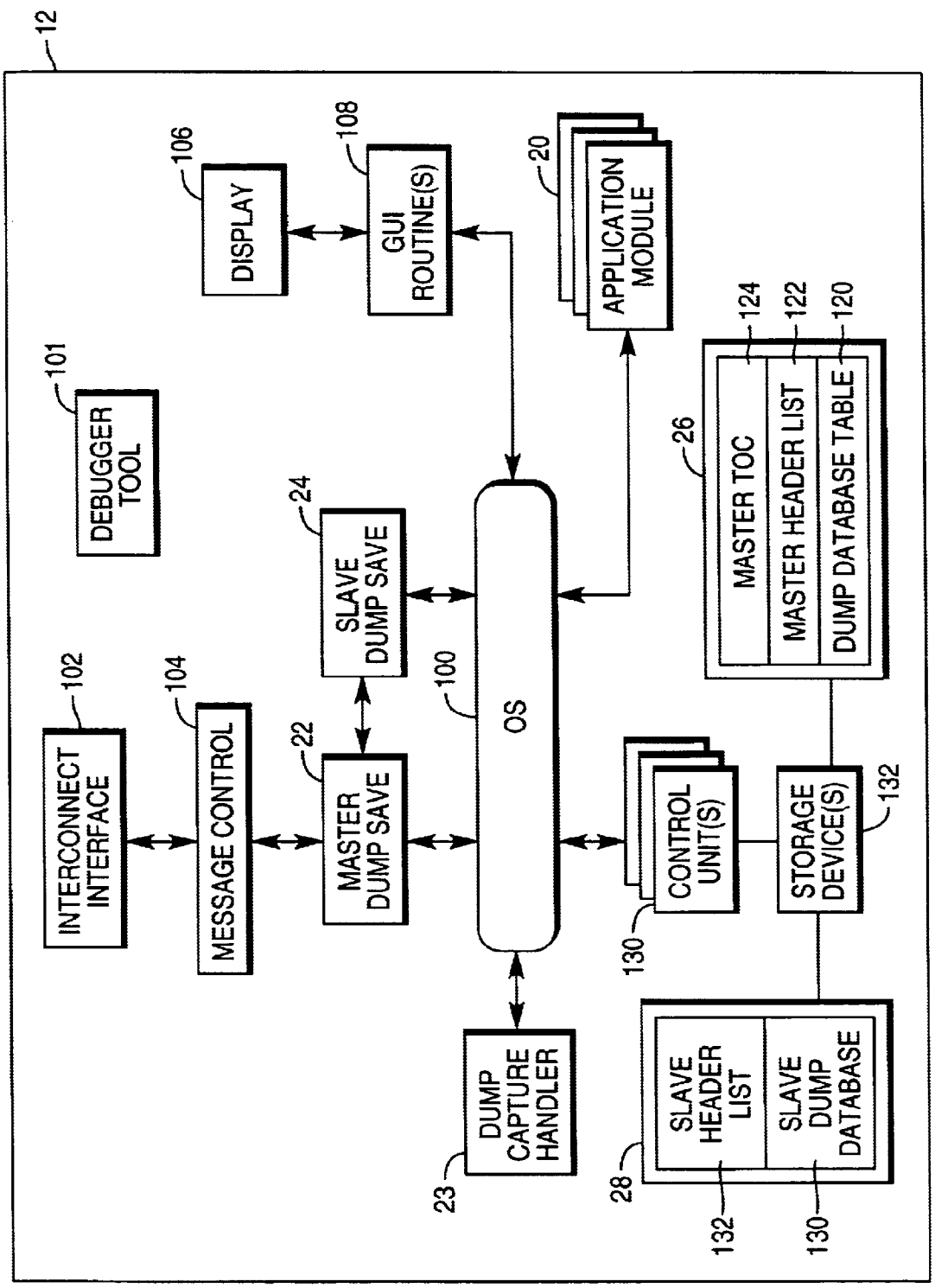
FIG. 2 is a block diagram of components in one of the nodes of FIG. 1 in accordance with an embodiment.

Referring to FIG. 2, each node 12 includes various components. The illustrated node 12 is the master node. The other nodes of the parallel processing system 10 may be identically arranged as the master node except that the master dump save routine 22 and the master dump database 26 are not present. In addition, the modules or routines shown in each node 12 do not necessarily run concurrently. For example, the dump capture handler 23 may be invoked when a fault first occurs. However, after the predetermined dump has been captured, the dump capture handler 23 may be stopped and the dump save routines (22 and 24) started.

An operating system 100 provides an environment in which various other modules or routines can run in. In one embodiment, the operating system 100 may be a WINDOWS® NT operating system from Microsoft Corporation. In further embodiments, other WINDOWS® operating systems or other types of operating systems may be employed. One example of another operating system is the UNIX operating system.

The node 12 also includes an interconnect interface 102 that is adapted to communicate over the interconnect network 14. A messaging controller 104 controls the communication of messages through the interconnect interface 102 over the interconnect network 14. In addition, the node 12 includes a display 106 and one or more graphical user interface (GUI) routines 108 that controls the presentation of user interfaces on the display 106. The GUI routines 108 may be capable of receiving selections made by the user on one or more selectors presented in the displayed user interface.

The various software modules and routines in each node 12 are executable on one or more control units 130. Instructions and data associated with the various software modules or routines may be stored in one or more storage devices 132. The one or more storage devices 132 may also store the master and slave dump databases 26 and 28.

If the operating system 100 is a WINDOWS® operating system (e.g., a WINDOWS® NT operating system), then software running in each of the nodes 12 are run as processes and threads. A process is an object that represents an instance of an executing program. Each process may be associated with one or more threads of execution. A thread is the basic executable unit in a WINDOWS® operating system.

To take advantage of the potential presence of plural control units 130 in each node 12, multiple threads may be started, with each thread executable on a separate control unit. For example, the dump capture handler 23 in each node 12 may have several threads to enhance the speed of a dump capture operation, which may be operating on a relatively large amount of data.

As shown in FIG. 2, the slave dump database 28 may include several sections in accordance with an embodiment. In the slave dump database 28, a dump database table 130 contains the dump data, which includes information associated with the state of the node and with the execution of software in the node 12 at the time a fault occurred. Information about each thread (referred to as a "thread context") may be stored. The thread context may include values of machine registers (e.g., stacks) associated with the thread and the function/subroutine calling history of the thread. In addition, information about each process (referred to as a "process context") may also be stored. The process context may include a pointer to the list of thread contexts for the process and the name of the program that was in execution and all memory (and associated memory address) that was writable to any thread in the process. The dump data may also include the "node context," which includes a pointer to a list of processes on the node that have been dumped. The dump data may also include any application-related files that are resident on the node and that need to be included in the dump.

The slave dump database 28 also includes a slave header list 132, which contains a dump token (an identifier to uniquely identify the dump) and an error code (to identify the type of fault that occurred). The header list 132 also includes pointers to all of the processes in the dump (that were running in the node 12) as well as pointers to node-specific shared data that were dumped with the processes. Further, the header list 132 may contain pointers to any application-related files that are part of the dump data.

The master dump database 26 also includes multiple sections, including a dump database table 120, a master header list 122, and a master table of contents 124. The master dump database table 120 includes selected portions of the slave dump database tables 130 of each of the nodes 12. The master header list 122 includes pointers to every node in the system 10 as well as information of the slave header lists 132 of each of the nodes 12. In addition, the master header list 122 may contain indications of completion of a dump operation in the respective plural nodes 12.

The master table of contents 124 contains a list of node contexts of the nodes 12 that are part of the dump, a list of process contexts in each node, a list of thread contexts in each process, and a list of application-related files that have been saved in the dump. The master header list 122 and the master table of contents 124 may be subsequently used by a debugger tool 101 that may be used to access the dump database 26 to diagnose problems associated with the system 10.

Figure 3:
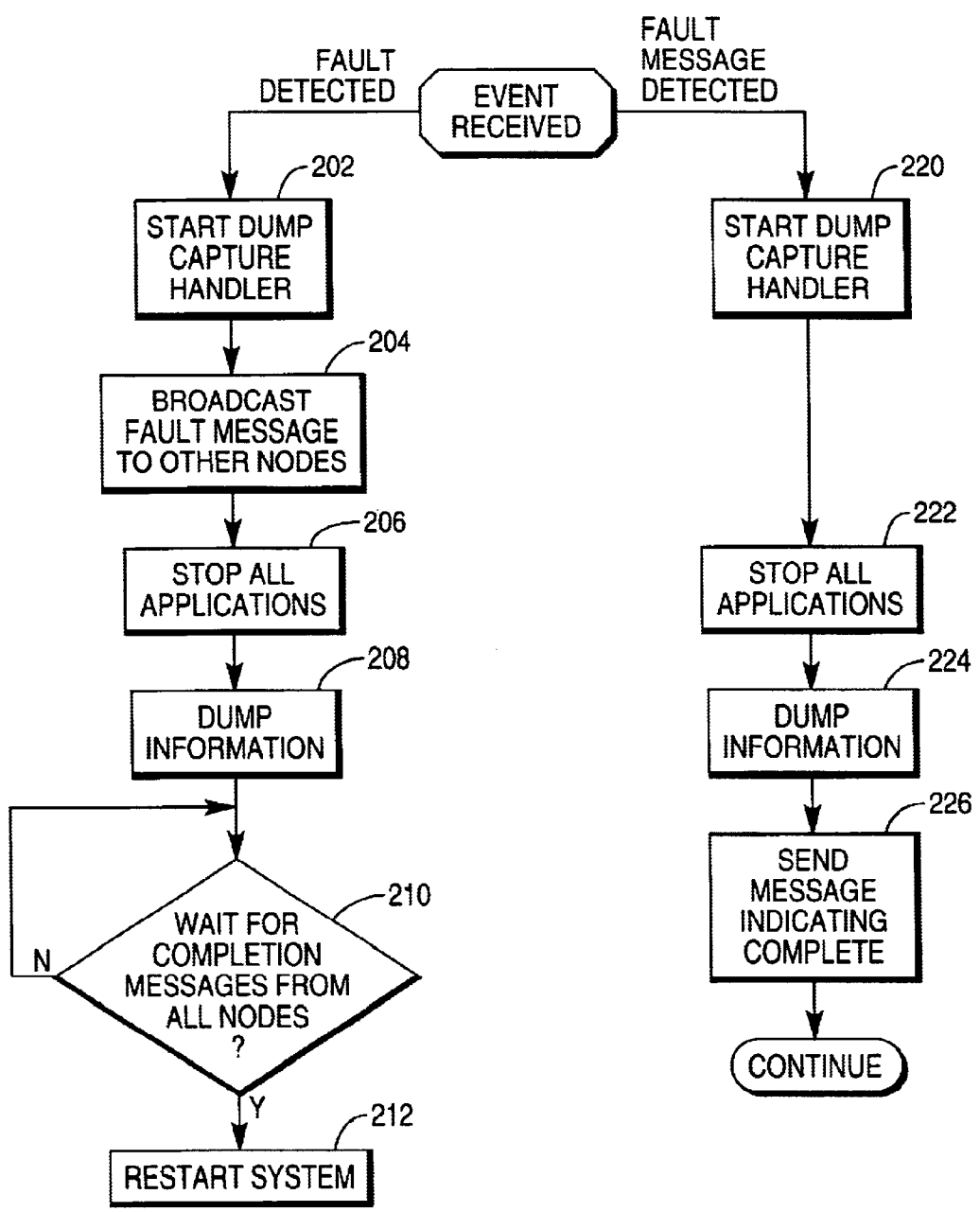
FIG. 3 is a flow diagram of a dump capture procedure in accordance with an embodiment performed in the system of FIG. 1.

Referring to FIG. 3, a dump capture process is illustrated. Each node 12 waits for receipt of an event, which may be detection of a fault. If a fault condition is detected, then the node 12 starts (at 202) the dump capture handler 23. When the dump capture handler 23 is started, it can create a unique token for the dump. The token may, for example, contain the following information: the date and time of the fault condition and the event identifier of the thread, process and node that initiated the fault condition. The dump capture handler 23 may be the trap or exception handler invoked by the operating system 100 in response to a fault, or the dump capture handler 23 may be a routine that can be invoked by the trap or exception handler.

A fault message is broadcast (at 204) by the dump capture handler 23 to other nodes in the system 10 to indicate occurrence of the fault condition. The fault message may contain the unique token. Next, the dump capture handler 23 stops execution (at 206) of all application modules 20 in the node 12. Thereafter, the dump capture handler 23 dumps (at 208) predetermined information into the slave dump database 28.

The dump capture handler 23 running on a node in which the fault was detected waits for completion messages from all other nodes (at 210). Once the fault message is broadcast to the other nodes, the other nodes 12 in the system 10 may start similar dump capture handlers 23 to perform capture of dump information. If completion messages have been received (at 210) from all other nodes, then the dump capture handler 23 restarts (at 212) the system 10.

A node in which a fault has not been detected but which receives a fault message sent over the interconnect network 14 may also start the dump capture handler 23 (at 220). However, in such other nodes, instead of creating a dump token, the dump capture handler 23 uses the token received in the fault message. In each of the other nodes, the dump capture handler 23 similarly stops (at 222) all application modules and stores (at 224) dump information into the slave dump database 28. After all dump information has been saved, a message is sent (at 226) by the node over the interconnect network 14 to the original node indicating that the dump capture has completed.

Figure 4:
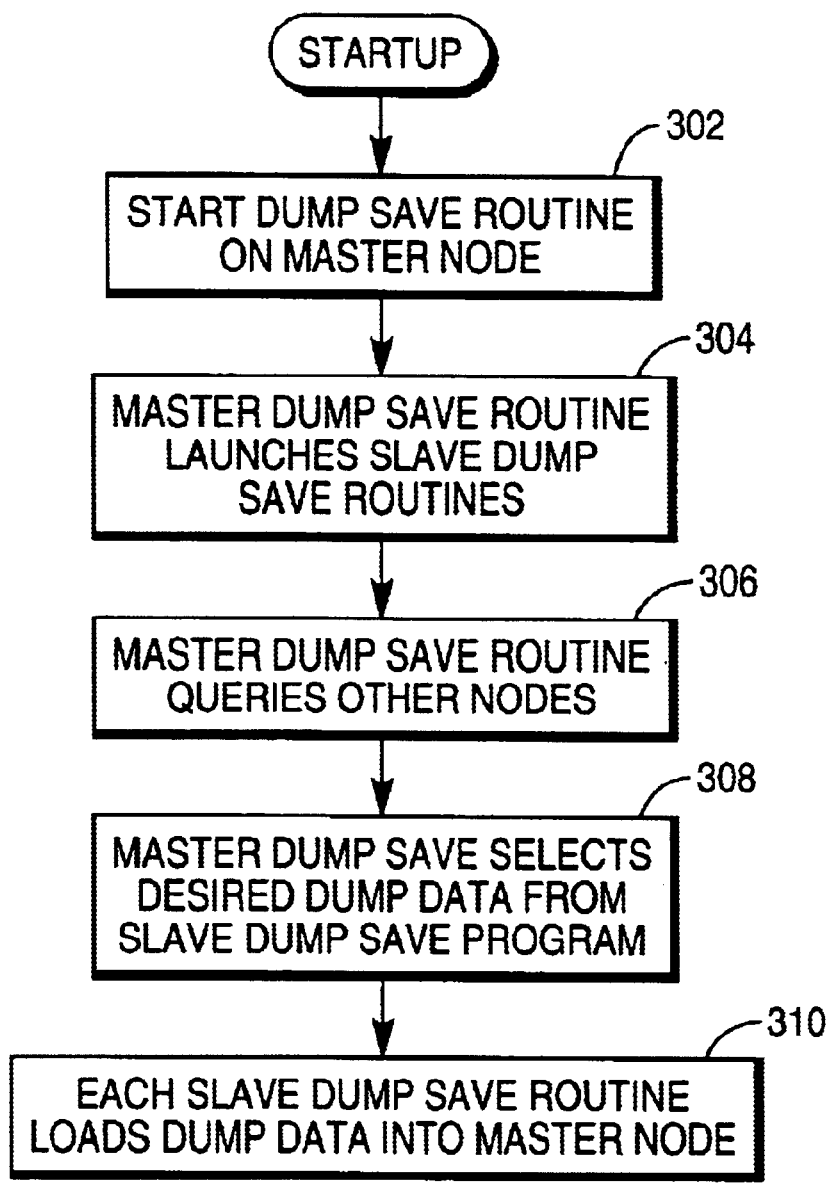
FIG. 4 is a flow diagram of a dump save procedure in accordance with an embodiment performed in the system of FIG. 1.

Referring to FIG. 4, after system restart (performed at 212 in FIG. 3) due to a dump capture, the system 10 starts a dump save routine (at 302) on a master node. The master node, which may be node 12A, may be the node with the lowest node identifier (ID). Alternatively, other criteria may be used to select the master node. Next, the master dump save routine launches (at 304) slave dump save routines on each of the nodes 12 in the system 10. The master dump save routine then queries (at 306) each of the other nodes 12 for the slave header list 132 in each of the slave dump databases 28. Next, the master dump save routine selects (at 308) the desired dump data from the slave dump save routine. In response to selection by the master dump save routine, each slave dump save routine then loads (at 310) the requested dump data into the master node over the interconnect network 14 to build the master dump database 26. The master dump database 26 can then be analyzed by the debugger tool 101.

As discussed above, the various nodes 12 each includes various software layers, routines, or modules. Such software layers, routines, or modules are executable on corresponding control units. The various control units in the network elements may each include a microprocessor, a microcontroller, a processor card (including one or more microprocessors or microcontrollers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various network elements may be stored in respective storage devices. The instructions when executed by a respective control unit cause the corresponding network element to perform programmed acts.

The instructions of the software routines, modules, or layers may be loaded or transported to each node 12 in one of many different ways. For example, code segments including instructions stored on floppy disks, CD or DVD media, a hard disk, or transported through a network interface card, modem, or other interface device may be loaded into the system and executed as corresponding software routines, modules, or layers. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of handling faults in a system having plural nodes including first and second nodes, comprising:
   detecting a fault condition in the first node;
   capturing predetermined information of each node; and
   starting a routine in the second node to coordinate the saving of the predetermined information to a common database.

2. The method of claim 1, wherein capturing the predetermined information includes storing information relating to one or more processes active in each node when the fault condition occurred.

3. The method of claim 1, wherein the nodes are coupled by an interconnect network, the method further comprising sending one or more messages to indicate the fault condition to the nodes.

4. The method of claim 3, wherein sending the one or more messages is performed by the first node to other nodes, the other nodes comprising the second node and at least one other node.

5. The method of claim 4, wherein capturing the predetermined condition comprises capturing dump information, the method further comprising:
   the other nodes storing dump information in response to the one or more messages; and
   the second node subsequently sending a request to at least nodes other than the second node to collect the stored dump information.

6. The method of claim 5, further comprising:
   launching, in at least each of the nodes other then the second node, a handler to collect the stored dump information in the corresponding node for storage into the common database.

7. The method of claim 6, further comprising transmitting the collected dump information to the second node, wherein the common database is stored by the second node.

8. The method of claim 1, wherein capturing the predetermined information includes storing information relating to one or more threads active in the corresponding node when the fault condition occurred.

9. The method of claim 8, further comprising running a WINDOWS® operating system in each of the nodes.

10. The method of claim 1, wherein capturing the predetermined information includes storing information relating to software routines active in the corresponding node when the fault condition occurred.

11. The method of claim 1, wherein the common database is contained in the second node, the method further comprising the routine receiving the predetermined information from each of the nodes.

12. The method of claim 11, wherein receiving the predetermined information includes receiving information relating to processes and threads.

13. The method of claim 12, further comprising running a WINDOWS® operating system in each of the nodes.

14. The method of claim 1, further comprising the second node checking that each of the other nodes has completed capturing the information.

15. The method of claim 1, wherein detecting the fault condition in the first node comprises detecting the fault condition by a software routine in the first node.

16. The method of claim 1, wherein the system comprises a database system, and wherein each of the plural nodes contains a database management application.

17. An article including one or more machine-readable storage media containing instructions for handling faults in a system having a plurality of nodes including first and second nodes, the instructions when executed causing the system to:

detect, by the first node, an occurrence of a fault in the first node;

collect predetermined information associated with each node in response to occurrence of the fault; and communicate the collected predetermined information to the second node for storage in the second node.

18. The article of claim 17, wherein detecting the occurrence of the fault in the first node is performed by a software routine in the first node.

19. The article of claim 17, wherein the system comprises a database system, and wherein the instructions when executed cause the system to execute a database management application in each node.

20. The article of claim 17, wherein the instructions when executed cause the system to:

send, by the first node, one or more messages to other nodes in response to detecting the fault condition, the other nodes including the second node and at least one other node, wherein each of the other nodes collect the predetermined information in response to the one or more messages.

21. The article of claim 20, wherein the instructions when executed cause the first node to determine that each of the nodes has completed collecting the predetermined information.

22. The article of claim 21, wherein the instructions when executed cause a restart of the system.

23. The article of claim 22, wherein the second node is designated as the master node, and wherein the instructions when executed cause the master node to invoke a master routine.

24. The article of claim 23, wherein the instructions when executed cause the master routine to invoke a slave routine in each of the other nodes.

25. The article of claim 24, wherein the instructions when executed cause the slave routines to communicate the collected predetermined information to the master routine.

26. The article of claim 20, wherein the instructions when executed cause the system to:

start, in response to an indication from the second node, a routine in each of the nodes to collect the predetermined information.

27. A system comprising a plurality of nodes including a master node and a first node, the first node to detect a fault condition in the first node and to store predetermined information in response to the fault condition;

nodes other than the first node to also store predetermined information in response to the fault condition, the nodes other than the first node including the master node; and the master node comprising:
a storage to store a database,
a handler to issue a request to capture the predetermined information stored by the nodes.

28. The system of claim 27, the first node to send one or more messages to the other nodes in response to the fault condition, the other nodes to store respective predetermined information in response to the one or more messages.

29. The system of claim 27, the master node to cause routines to launch in each of the nodes to collect respective predetermined information.

30. The system of claim 29, wherein the nodes contain routines to communicate the predetermined information to the master node, and wherein each of the routines is a slave routine, the master node further comprising a master routine capable of controlling tasks performed by each slave routine.

31. The system of claim 29, wherein the database to store collected predetermined information received by the master routine from each of the slave routines.

32. The system of claim 31, wherein the master routine receives an indication that slave routines have completed collecting the information.

33. The system of claim 27, wherein the predetermined information comprises dump information.

34. The system of claim 27, wherein the database to store predetermined information received from each of the nodes.

35. The system of claim 27, wherein the predetermined information includes a process context containing information relating to processes.

36. The system of claim 35, wherein the predetermined information includes a thread context containing information relating to threads.

37. The system of claim 36, wherein the predetermined information includes a node context containing pointers to processes in the node.

38. The system of claim 37, wherein the predetermined information includes application-related files.

39. The system of claim 27, wherein each node includes a WINDOWS® operating system.

* * * * *